United States Patent
Zhu et al.

(10) Patent No.: US 12,277,428 B2
(45) Date of Patent: Apr. 15, 2025

(54) DISPLAY DEVICE CONTROL METHOD AND DISPLAY DEVICE

(71) Applicant: Huawei Technologies Co., Ltd., Shenzhen (CN)

(72) Inventors: Wei Zhu, Wuhan (CN); Xingyang Sun, Wuhan (CN); Li Fu, Beijing (CN); Qinghai Liang, Shenzhen (CN); Chiahsing Chung, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 18/248,986

(22) PCT Filed: Sep. 8, 2021

(86) PCT No.: PCT/CN2021/117206
§ 371 (c)(1),
(2) Date: Apr. 13, 2023

(87) PCT Pub. No.: WO2022/078118
PCT Pub. Date: Apr. 21, 2022

(65) Prior Publication Data
US 2023/0385084 A1 Nov. 30, 2023

(30) Foreign Application Priority Data
Oct. 14, 2020 (CN) .......................... 202011098871.3

(51) Int. Cl.
G06F 9/451 (2018.01)
G06F 3/0482 (2013.01)
(Continued)

(52) U.S. Cl.
CPC ............ *G06F 9/451* (2018.02); *G06F 3/0482* (2013.01); *G06F 3/0488* (2013.01); *G06F 9/4406* (2013.01); *G06F 3/04847* (2013.01)

(58) Field of Classification Search
CPC ...... G06F 9/451; G06F 9/4406; G06F 3/0482; G06F 3/0488; G06F 3/04847; G06F 9/0482; G06F 9/0488; G06F 9/04847
See application file for complete search history.

(56) References Cited

U.S. PATENT DOCUMENTS

| 8,766,941 B2 | 7/2014 | Pan |
| 2011/0310300 A1* | 12/2011 | Wakisaka ............. H04N 21/485 348/563 |

(Continued)

FOREIGN PATENT DOCUMENTS

| CN | 102215357 A | 10/2011 |
| CN | 102226884 A | 10/2011 |

(Continued)

*Primary Examiner* — Tadesse Hailu
(74) *Attorney, Agent, or Firm* — Conley Rose, P.C.

(57) ABSTRACT

A display device control method includes when an operation on an on-screen display (OSD) input device is received, determining whether a signal generated by operating the OSD input device is currently sent to an OSD system or an operating system (OS); and when the signal generated by operating the OSD input device is currently sent to the OS, switching, according to a control signal generated by the OSD input device, the control signal from being sent to the OSD system to being sent to the OS. This application further provides a display device.

20 Claims, 8 Drawing Sheets

(51) Int. Cl.
*G06F 3/0488* (2022.01)
*G06F 9/4401* (2018.01)
*G06F 3/04847* (2022.01)

(56) References Cited

U.S. PATENT DOCUMENTS

| | | | |
|---|---|---|---|
| 2014/0143668 A1* | 5/2014 | Hsu | A63F 13/837 |
| | | | 715/716 |
| 2016/0249006 A1* | 8/2016 | Park | H04N 21/42204 |
| 2016/0313835 A1 | 10/2016 | He et al. | |
| 2021/0141653 A1* | 5/2021 | Wang | G06F 3/0482 |
| 2022/0244794 A1* | 8/2022 | Kaplanis | G06F 13/4282 |

FOREIGN PATENT DOCUMENTS

| | | |
|---|---|---|
| CN | 103246443 A | 8/2013 |
| WO | 2020091815 A1 | 5/2022 |

* cited by examiner

DISPLAY DEVICE CONTROL METHOD AND DISPLAY DEVICE

CROSS-REFERENCE TO RELATED APPLICATIONS

This is a National Stage of International Patent Application No. PCT/CN2021/117206 filed on Sep. 8, 2021, which claims priority to Chinese Patent Application No. 202011098871.3 filed on Oct. 14, 2020, both of which are hereby incorporated by reference in their entireties.

TECHNICAL FIELD

This application relates to the field of terminal technologies, and in particular, to a display device control method and a display device.

BACKGROUND

Conventional display devices such as a display and a television usually support an OSD system, and an OSD input device is disposed for a user to operate the OSD system. An intelligent terminal such as a mobile phone, a PAD, or a PC usually uses an input device such as a keyboard or a mouse to perform interaction between a person and an OS system.

With the development of intelligence, conventional display devices such as a display and a television also support an OS system. However, such a display device is usually not connected to an input device such as a keyboard or a mouse. To interact with the OS system in such a display device, another external device, such as a mobile phone or a remote control, is usually needed. The mobile phone needs to be used to control the OS system of the display device, and a corresponding app needs to be installed in the mobile phone. When the mobile phone is used, the app needs to be used to perform a search operation and an operation of pairing with the display device. In addition, there may also be a problem of matching between the app in the mobile phone and a function version of the display device. When the remote control is used to control the OS system of the display device, costs of the remote control are increased. In addition, the remote control may be lost because the remote control is separated from the display device.

SUMMARY

In view of the foregoing content, a display device control method and a display device need to be provided, to control an OSD system and an OS system by using an OSD input device, which requires no additional external device and facilitates operations.

An embodiment of this application provides a display device control method. The method includes:
 when an operation on an OSD input device is received, determining whether a signal generated by operating the OSD input device is currently sent to an OSD system or an OS system; and
 if the signal generated by operating the OSD input device is currently sent to the OS system, switching, according to a control signal generated by the OSD input device, the control signal from being sent to the OSD system to being sent to the OS system.

According to some embodiments of this application, the method further includes:
 when an operation on a signal selection device is received, determining whether the signal generated by operating the OSD input device is currently sent to the OSD system or the OS system; and
 if the signal generated by operating the OSD input device is currently sent to the OSD system, switching, according to a switching signal generated by the signal selection device, the signal generated by operating the OSD input device from being sent to the OSD system to being sent to the OS system.

According to some embodiments of this application, after the switching, according to a switching signal generated by the signal selection device, the signal generated by operating the OSD input device from being sent to the OSD system to being sent to the OS system, the method further includes:
 starting a timeout timer; and
 the method further includes:
 after the timeout timer is started, determining whether the timeout timer expires and no operation on the OSD input device and the signal selection device is received; and
 if the timeout timer expires and no operation on the OSD input device and the signal selection device is received, switching the signal generated by operating the OSD input device from being sent to the OS system to being sent to the OSD system.

According to some embodiments of this application, the method further includes:
 when an application is in an interactive state, determining, by using the application, whether a user needs to interact with the application;
 generating a first switching instruction if the user needs to interact with the application; and
 switching, according to the first switching instruction, the signal generated by operating the OSD input device from being sent to the OSD system to being sent to the OS system.

According to some embodiments of this application, the method further includes:
 generating a second switching instruction if the user does not need to interact with the application; and
 switching, according to the second switching instruction, the signal generated by operating the OSD input device from being sent to the OS system to being sent to the OSD system.

According to some embodiments of this application, the method further includes:
 converting, by using an OS unit, the first switching instruction into a first OSD switching signal that conforms to an OSD system format, encapsulating the first OSD signal into a first OSD switching instruction that conforms to a format of a data transmission protocol, and sending the first OSD switching instruction to the OSD unit;
 decapsulating, by using the OSD unit, the first OSD switching instruction to restore the first OSD switching signal; and
 switching, by using the OSD unit according to the first OSD switching signal, the signal generated by operating the OSD input device from being sent to the OSD system to being sent to the OS system.

According to some embodiments of this application, the method further includes:
 if the user needs to interact with the application, generating a prompt for operating the OSD input device; and
 clearing, according to the control signal, the prompt for operating the OSD input device.

According to some embodiments of this application, the method further includes:

detecting whether a display device currently generates an OSD menu; and if the display device currently generates the OSD menu, and the signal generated by operating the OSD input device is switched to be sent to the OS system, clearing the OSD menu.

According to some embodiments of this application, the method further includes:

converting, by using an OSD unit, the control signal into an OS control signal that conforms to an OS system format, and encapsulating the OS control signal into an OS control instruction that conforms to a format of a data transmission protocol;

receiving the OS control instruction by using an OS unit, and decapsulating the OS control instruction into the OS control signal; and processing the OS control signal by using the OS unit, generating a control instruction, and sending the control instruction to a corresponding application to control the application.

An embodiment of this application provides a display device. The display device includes an OSD input device, and the display device further includes an OSD signal distribution module.

The OSD signal distribution module is configured to: when an operation on the OSD input device is received, determine whether the OSD signal distribution module currently sends, to an OSD system or an OS system, a signal generated by operating the OSD input device.

The OSD signal distribution module is further configured to: if the OSD signal distribution module currently sends, to the OS system, the signal generated by operating the OSD input device; and switch, according to a control signal generated by the OSD input device, the control signal from being sent to the OSD system to being sent to the OS system.

According to some embodiments of this application, the display device further includes a signal selection device.

The OSD signal distribution module is further configured to: when an operation on the signal selection device is received, determine whether the OSD signal distribution module currently sends, to the OSD system or the OS system, the signal generated by operating the OSD input device.

The OSD signal distribution module is further configured to: if the OSD signal distribution module currently sends, to the OSD system, the signal generated by operating the OSD input device, switch, according to a switching signal generated by the signal selection device, the signal generated by operating the OSD input device from being sent to the OSD system to being sent to the OS system.

According to some embodiments of this application, after the switching, according to a switching signal generated by the signal selection device, the signal generated by operating the OSD input device from being sent to the OSD system to being sent to the OS system, the OSD signal distribution module is further configured to:

start a timeout timer;

determine whether the timeout timer expires and no operation on the OSD input device and the signal selection device is received; and if the timeout timer expires and no operation on the OSD input device and the signal selection device is received, switch the signal generated by operating the OSD input device from being sent to the OS system to being sent to the OSD system.

According to some embodiments of this application, the display device further includes an application.

The application is configured to: when the application is in an interactive state, determine whether a user needs to interact with the application.

The application is further configured to generate a first switching instruction if the user needs to interact with the application.

The OSD signal distribution module is further configured to switch, according to the first switching instruction, the signal generated by operating the OSD input device from being sent to the OSD system to being sent to the OS system.

According to some embodiments of this application, the application is further configured to generate a second switching instruction if the user does not need to interact with the application.

The OSD signal distribution module is further configured to switch, according to the second switching instruction, the signal generated by operating the OSD input device from being sent to the OS system to being sent to the OSD system.

According to some embodiments of this application, the display device further includes an OSD unit and an OS unit, the OSD unit includes the OSD signal distribution module, the OSD unit further includes an OS signal conversion module, the OS unit is in communication connection to the OSD unit, the OS unit includes the application, and the OS unit further includes an OSD signal processing module.

The OSD signal processing module is configured to: receive the first switching instruction sent by the application, convert the first switching instruction into a first OSD switching signal that conforms to an OSD system format, encapsulate the first OSD signal into a first OSD switching instruction that conforms to a format of a data transmission protocol, and send the first OSD switching instruction to the OS signal conversion module.

The OS signal conversion module is configured to: decapsulate the first OSD switching instruction to restore the first OSD switching signal, and send the first OSD switching signal to the OSD signal distribution module.

The OSD signal distribution module is further configured to switch, according to the first OSD switching signal, the signal generated by operating the OSD input device from being sent to the OSD system to being sent to the OS system.

According to some embodiments of this application, the display device further includes an OSD unit and an OS unit, the OSD unit includes the OSD signal distribution module, the OSD unit further includes an OS signal conversion module, the OS unit is in communication connection to the OSD unit, and the OS unit includes an OSD signal processing module and an input subsystem.

The OS signal conversion module is configured to convert the control signal into an OS control signal that conforms to an OS system format, and encapsulate the OS control signal into an OS control instruction that conforms to a format of a data transmission protocol.

The OSD signal processing module is configured to receive the OS control instruction, and decapsulate the OS control instruction into the OS control signal.

The input subsystem is configured to receive the OS control signal, process the OS control signal, generate a control instruction, and send the control instruction to a corresponding application to control the application.

The display device control method and the display device in this application may determine, when the operation on the OSD input device is received, whether the signal generated by operating the OSD input device is currently sent to the OSD system or the OS system. If the signal generated by operating the OSD input device is currently sent to the OS system, according to a control signal generated by the OSD input device, the control signal is switched from being sent to the OSD system to being sent to the OS system, so that the OSD system and the OS system are controlled by using the OSD input device, which requires no additional external device and facilitates operations.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the terms such as "for example" or "example" is intended to present a related concept in a specific manner.

Unless otherwise defined, all technical and scientific terms used in this specification have same meanings as those usually understood by persons skilled in the art of this application. The terms used in the specification of this application are merely for the purpose of describing specific embodiments, and are not intended to limit the present invention. It should be understood that m this application, unless otherwise specified. "a plurality of" means two or more than two.

Figure 1:
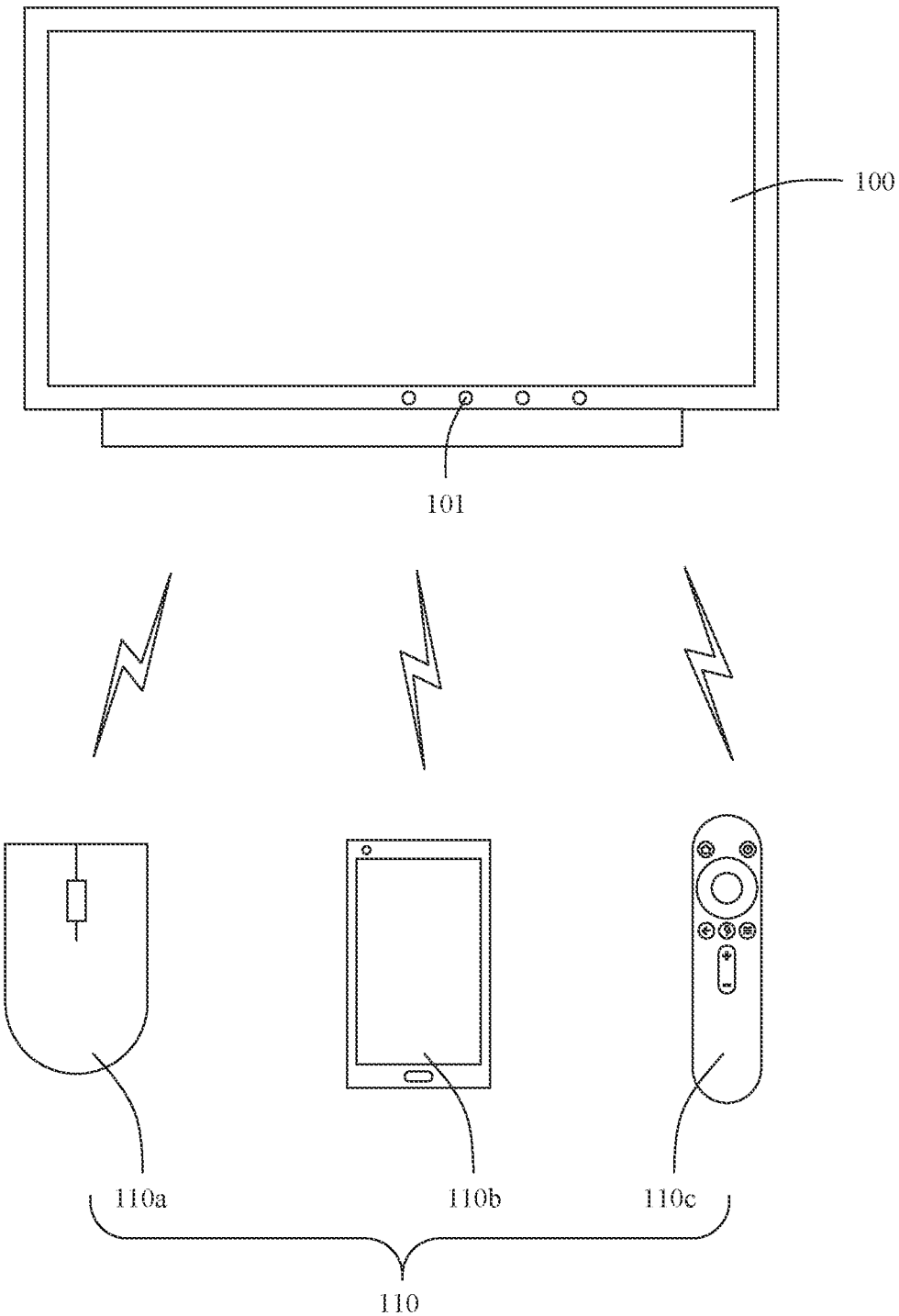
FIG. 1 is a schematic diagram of a use status of a display device according to an embodiment of the present invention.

FIG. 1 is a schematic diagram of a use status of a display device according to an embodiment of the present invention. As shown in FIG. 1, the display device 100 may be operated by an external device 110. The external device 110 may be an OS input device 110a such as a mouse or keyboard, a smart device 110b, and a remote control 110c. The OS input device 110a, such as a mouse and a keyboard, may be connected to the display device 100 in a wired or wireless manner to control an OS system of the display device 100. The smart device 110b may be a mobile phone, a tablet computer, or the like. The smart device 110b may control the OS (Operating System) of the display device 100 by using an app (Application) in the smart device 110b to connect to the display device 100 by using a wireless network. The remote control 110c may communicate with the display device 100 in a manner of infrared protocol communication, Bluetooth protocol communication, Zigbee protocol communication, or short-distance communication, and may control the OS system of the display device 100.

The display device 100 may be an electronic device having an OSD key, such as a television or a projector. This is not limited in this application.

The display device 100 may be a liquid crystal display, an organic light-emitting diode display, a plasma display, a smart television, or the like. An OSD (On-Screen Display) input device 101 is disposed on the display device 100. The OSD input device 101 may be a key, a touch bar, or the like. There may be one or more keys. The OSD input device 101 is configured to be operated by a user, so that an OSD system controls an OSD menu. The OSD menu is displayed on an image displayed by the display device 100 in an overlay manner.

Figure 2:
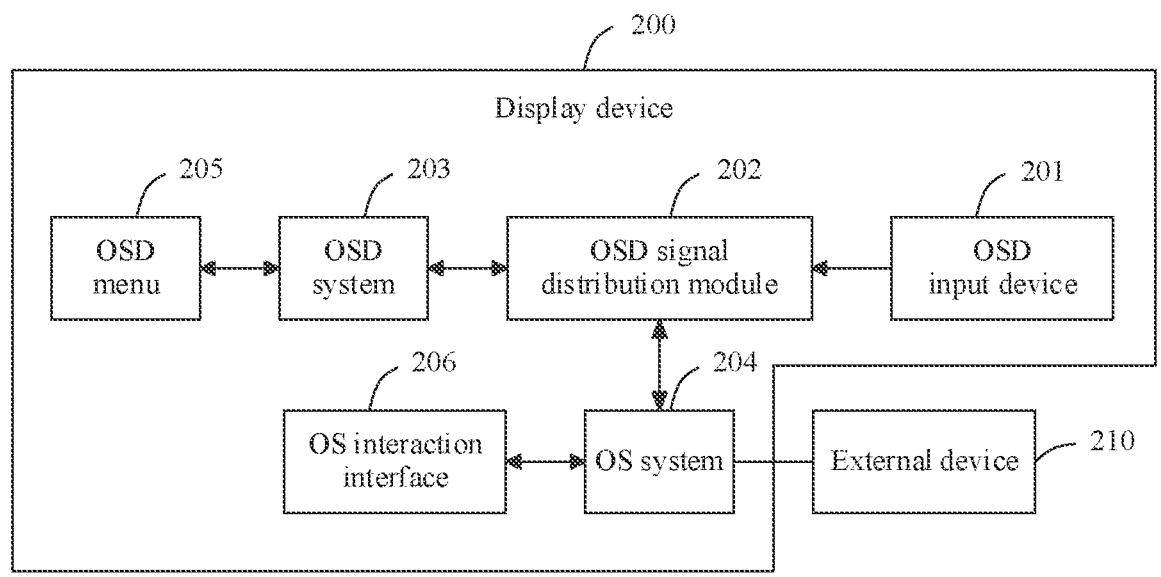
FIG. 2 is a block diagram of a use status of the display device in FIG. 1.

FIG. 2 is a block diagram of a use status of a display device according to an embodiment of the present invention. The display device 200 is connected to an external device 210. The display device 200 includes an OSD input device 201. The display device 200 further includes an OSD signal distribution module 202, an OSD system 203, and an OS system 204. The OSD signal distribution module 202 connects the OSD input device 201 and the OSD system 203, and the OSD signal distribution module 202 further connects the OSD input device 201 and the OS system 204. The OSD signal distribution module 202 may be configured to send a control signal generated by the OSD input device 201 to the OSD system 203 to control an OSD menu 205. The OSD signal distribution module 202 may be further configured to send the control signal generated by the OSD input device 201 to the OS system 204 to control an OS interaction interface 206.

Figure 3:
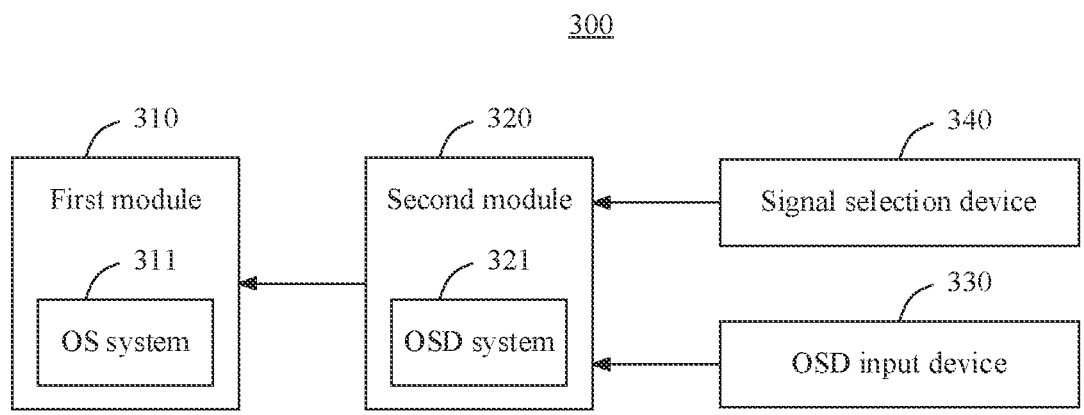
FIG. 3 is a block diagram of a display device according to a first embodiment of the present invention.

FIG. 3 is a block diagram of a display device according to a first embodiment of the present invention. The display device 3M) includes a first module 310, a second module 320, an OSD input device 330, and a signal selection device 340. An OS system 311 is installed in the first module 310. The first module 310 may be a chip. An OSD system 321 is installed in the second module 320. The second module 320 may be a chip. The second module 320 is in communication connection to the first module 310. In this embodiment, the second module 320 is in communication connection to the first module 310 by using a wired protocol such as a UART protocol, an SPI protocol, or an IIC protocol. The OSD input device 330 is connected to the second module 320. The OSD input device 330 is configured to control the OSD system 321. The signal selection device 340 is connected to the second module 320. The signal selection device 340 may be configured to send a control signal of the OSD input device 330 to the first module 310 via the second module 320, to control the OS system 311.

Figure 4:
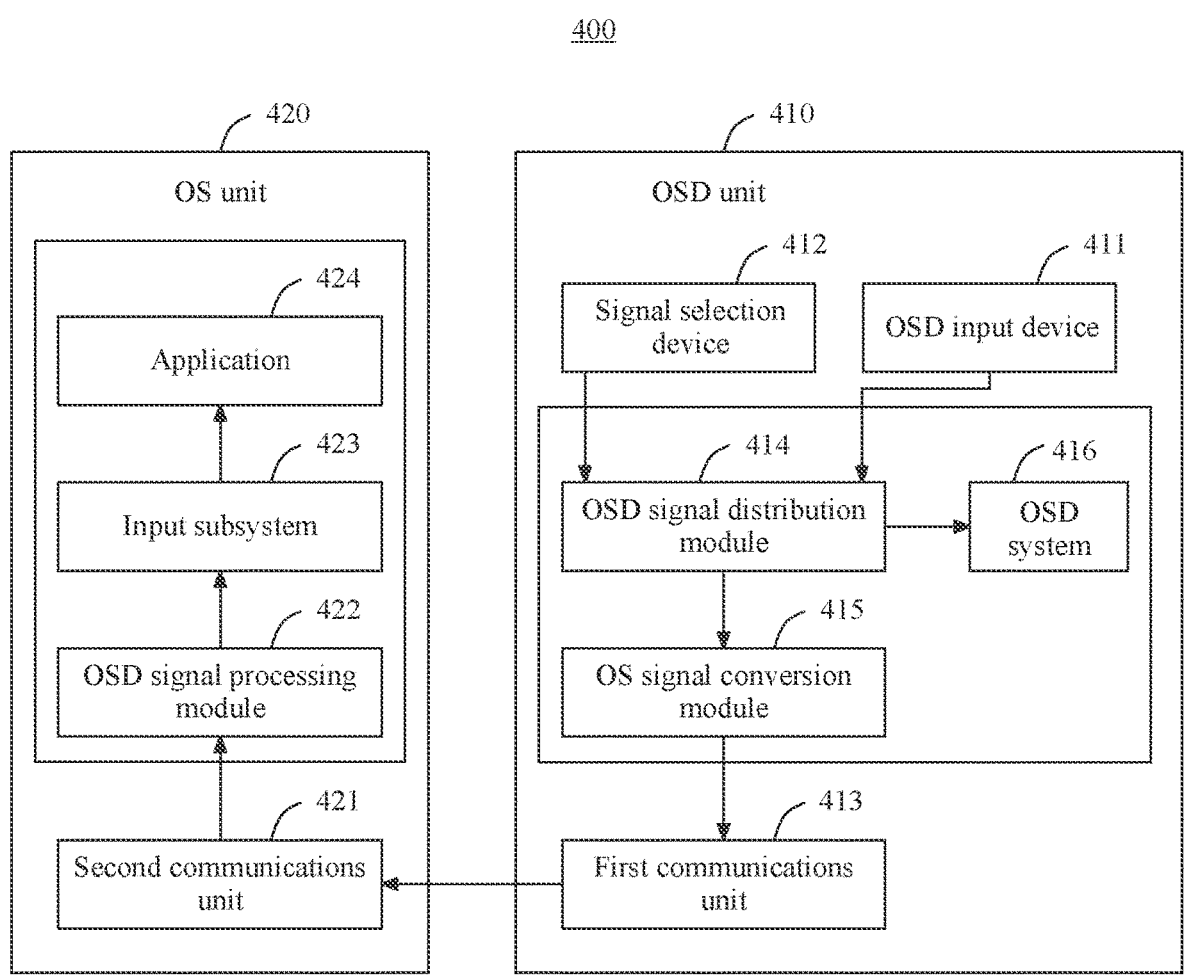
FIG. 4 is a block diagram of communication between an OSD unit and an OS unit of a display device according to a first embodiment of the present invention.

In addition, FIG. 4 is a block diagram of communication between an OSD unit and an OS unit of a display device according to a first embodiment of the present invention. The display device 400 includes an OSD unit 410 and an OS unit 420. In this embodiment, the display device 400 performs, according to an operation on the OSD unit 410, switching controlled by the OSD input device. The OSD unit 410 of the display device 400 includes an OSD input device 411, a signal selection device 412, and a first communications unit 413. The OSD unit 410 of the display device 400 further includes an OSD signal distribution module 414, an OS signal conversion module 415, and an OSD system 416.

The OSD input device 411 is connected to the OSD signal distribution module 414, and is configured to generate a control signal according to an operation and send the control signal to the OSD signal distribution module 414. The signal selection device 412 is connected to the OSD signal distribution module 414, and is configured to generate a switching signal to the OSD signal distribution module 414 according to an operation, so as to control the OSD signal distribution module 414 to send the control signal to the OSD system 416 or the OS signal conversion module 415.

The signal selection device 412 may be a combination of one or more of the OSD input devices 411. For example, the OSD input device 411 includes four keys; an OSD 1 key, an OSD 2 key, an OSD 3 key, and an OSD 4 key. The signal selection device 412 is the OSD 1 key or a combination of the OSD 1 key and the OSD 2 key. In this embodiment, different functions may be set for a same key by setting different operation time, different quantities of operation times, and the like. The setting different operation time to set a same key to have different functions may be: for example, setting long pressing the OSD 1 key to be a function of the OSD input device 411, and setting short pressing the OSD 1 key to be a function of the signal selection device 412. The setting different quantities of operation times to set a same key to have different functions may be: for example, setting pressing once within one second to be a function of the OSD input device 411, and pressing twice within one second to be a function of the signal selection device 412. The signal selection device 412 may also be a device independent of the OSD input device 411. For example, the OSD input device 411 is the OSD 1 key, and the signal selection device 412 is the OSD 2 key.

The signal selection device 412 may also be exactly the same as the OSD input device 411. For example, the OSD input device 411 is the OSD 1 key, and the signal selection device 412 is also the OSD 1 key. In this embodiment, different functions may be set for a same key by setting different operation time, different quantities of operation times, and the like. Alternatively, for example, the OSD input device 411 is a touch bar 1, and the signal selection device 412 is also the touch bar 1. In this embodiment, different functions may be set for a same touch bar by setting different touch operations, different touch position operations, and the like. The setting different touch operations to set the touch bar to have different functions may be, for example, setting a one-finger operation to be a function of the OSD input device 411, and setting the two-finger slide operation to be a function of the signal selection device 412. The setting different touch position operations to set the touch bar to have different functions may be, for example, setting an operation in a first position area of the touch bar to be a function of the OSD input device 411, and setting an operation in a second position area of the touch bar to be a function of the signal selection device 412.

The OSD signal distribution module 414 is connected to the OS signal conversion module 415 and the OSD system 416. The OSD signal distribution module 414 is configured to determine, according to the switching signal, whether the signal generated by operating the OSD input device 411 is sent to the OSD system 416 or the OS system (the OS signal conversion module 415). Specifically, the OSD signal distribution module 414 is configured to: when the switching signal is received, determine whether the OSD signal distribution module 414 currently sends, to the OSD system 416 or the OS system, the signal generated by operating the OSD input device 411. If the OSD signal distribution module 414 currently sends, to the OSD system 416, the signal generated by operating the OSD input device 411, the OSD signal distribution module 414 is configured to switch, according to the switching signal, to send, to the OS system, the signal generated by operating the OSD input device 411. In this embodiment, the OSD signal distribution module 414 is further configured to detect whether the display device 400 currently generates an OSD menu. If the display device 400 currently generates the OSD menu, and the OSD signal distribution module 414 is switched to send the signal to the OS system, the OSD signal distribution module 414 is further configured to clear the OSD menu. In this embodiment, the OSD signal distribution module 414 is further configured to start a timeout timer. If the OSD signal distribution module 414 currently sends, to the OS system, the signal generated by operating the OSD input device 411, the OSD signal distribution module 414 is configured to switch, according to the switching signal, to send, to the OSD system 416, the signal generated by operating the OSD input device 411. In this embodiment, the OSD signal distribution module 414 is further configured to disable the timeout timer. In an initial state, the OSD signal distribution module 414 is configured to send the control signal to the OSD system 416.

The OSD signal distribution module 414 is configured to send the control signal to the OS system (the OS signal conversion module 415) or the OSD system 416 according to the control signal. Specifically, the OSD signal distribution module 414 is configured to: when the control signal is received, determine whether the OSD signal distribution module 414 currently sends, to the OSD system 416 or the OS system, the signal generated by operating the OSD input device 411. If the OSD signal distribution module 414 currently sends, to the OSD system 416, the signal generated by operating the OSD input device 411, the OSD signal distribution module 414 is configured to send the control signal to the OSD system 416. If the OSD signal distribution module 414 currently sends, to the OS system, the signal generated by operating the OSD input device 411, the OSD signal distribution module 414 sends the control signal to the OS system (the OS signal conversion module 415). In this embodiment, the OSD signal distribution module 414 is further configured to prolong the timeout timer. The prolonging the timeout timer may be, for example, when the duration of the timeout timer is 5 seconds and the control signal is received at the fourth second, prolonging the duration of the timeout timer to 5 seconds.

The OSD signal distribution module 414 is further configured to: after the timeout timer is started, determine whether the timeout timer expires and no operation on the OSD input device 411 and the signal selection device 412 is received. If the timeout timer expires and no operation on the OSD input device 411 and the signal selection device 412 is received, the OSD signal distribution module 414 is further configured to switch to send, to the OSD system 416, the signal generated by operating the OSD input device 411. In this embodiment, the OSD signal distribution module 414 is further configured to disable the timeout timer. If the timeout timer does not expire and an operation on the signal selection device 412 is received, the OSD signal distribution module 414 is further configured to determine, according to the switching signal, whether the signal generated by operating the OSD input device 411 is sent to the OSD system 416 or the OS system. If the timeout timer does not expire and an operation on the OSD input device 411 is received, the OSD signal distribution module 414 is further configured to send the control signal to the OS signal conversion module 415 or the OSD system 416. The OS signal conversion module 415 is configured to: convert the control signal into an OS control signal that conforms to an OS system format, and encapsulate the OS control signal into an OS control instruction that conforms to a format of a data transmission protocol. In this embodiment, the OS signal conversion module 415 is configured to convert, according to Table 1 and Table 2, the control signal into the OS control signal that conforms to an OS system format. The control signal includes a key number or an operation of a touch bar. Table 1 may be shown in the following Table 1a:

TABLE 1a

| Key number | OS signal |
| --- | --- |
| Key 1 | KeyEvent. KEYCODE_ENTER |
| Key 2 | KeyEvent. KEYCODE_DPAD_LEFT |
| Key 3 | KeyEvent. KEYCODE_DPAD_RIGHT |
| Key 4 | KeyEvent. KEYCODE_BACK |

Table 1 may be shown in the following Table 1b:

TABLE 1b

| Key number | OS signal |
| --- | --- |
| Key 1 | KeyEvent. KEYCODE_ENTER |
| Key 2 | KeyEvent. KEYCODE_DPAD_UP |
| Key 3 | KeyEvent. KEYCODE_DPAD_DOWN |
| Key 4 | KeyEvent. KEYCODE_BACK |

Table 2 may be shown as follows:

TABLE 2

| Operations on the touch bar | OS signal |
| --- | --- |
| Slide | MotionEvent.ACTION_MOVE |
| One-finger touch | MotionEvent.ACTION_DOWN |
| One-finger leaving | MotionEvent.ACTION_UP |
| Two-finger click | KEYCODE_BACK |

The OSD system 416 is configured to generate an OSD menu and process an OSD control function in the OSD menu. The OSD control function includes control functions such as color temperature, display brightness, contrast, and phase.

The first communications unit 413 may be a UART module, an SPI module, an IIC module, or the like. The first communications unit 413 is connected to the OS signal conversion module 415, and is configured to enable the OS signal conversion module 415 to communicate with the OS unit 420 of the display device 400.

The OS unit 420 of the display device 400 includes a second communications unit 421. The OS unit 420 of the display device 400 further includes an OSD signal processing module 422, an input (Input) subsystem 423, and an application 424. The second communications unit 421 may be a UART module, an SPI module, an IIC module, or the like. The second communications unit 421 is in communication connection to the first communications unit 413, and is configured to enable the OS unit 420 of the display device 400 to communicate with the first communications unit 413.

The OSD signal processing module 422 is configured to receive the OS control instruction sent by the OS signal conversion module 415 by using the second communications unit 421 and the first communications unit 413, and encapsulate the OS control instruction to restore the OS control signal. The input subsystem 423 is configured to receive the OS control signal sent by the OSD signal processing module 422, process the OS control signal, generate the control instruction, and send the control instruction to the corresponding application 424 to control the application 424.

The application 424 includes an image application, an audio and video application, a game application, and the like.

Figure 5:
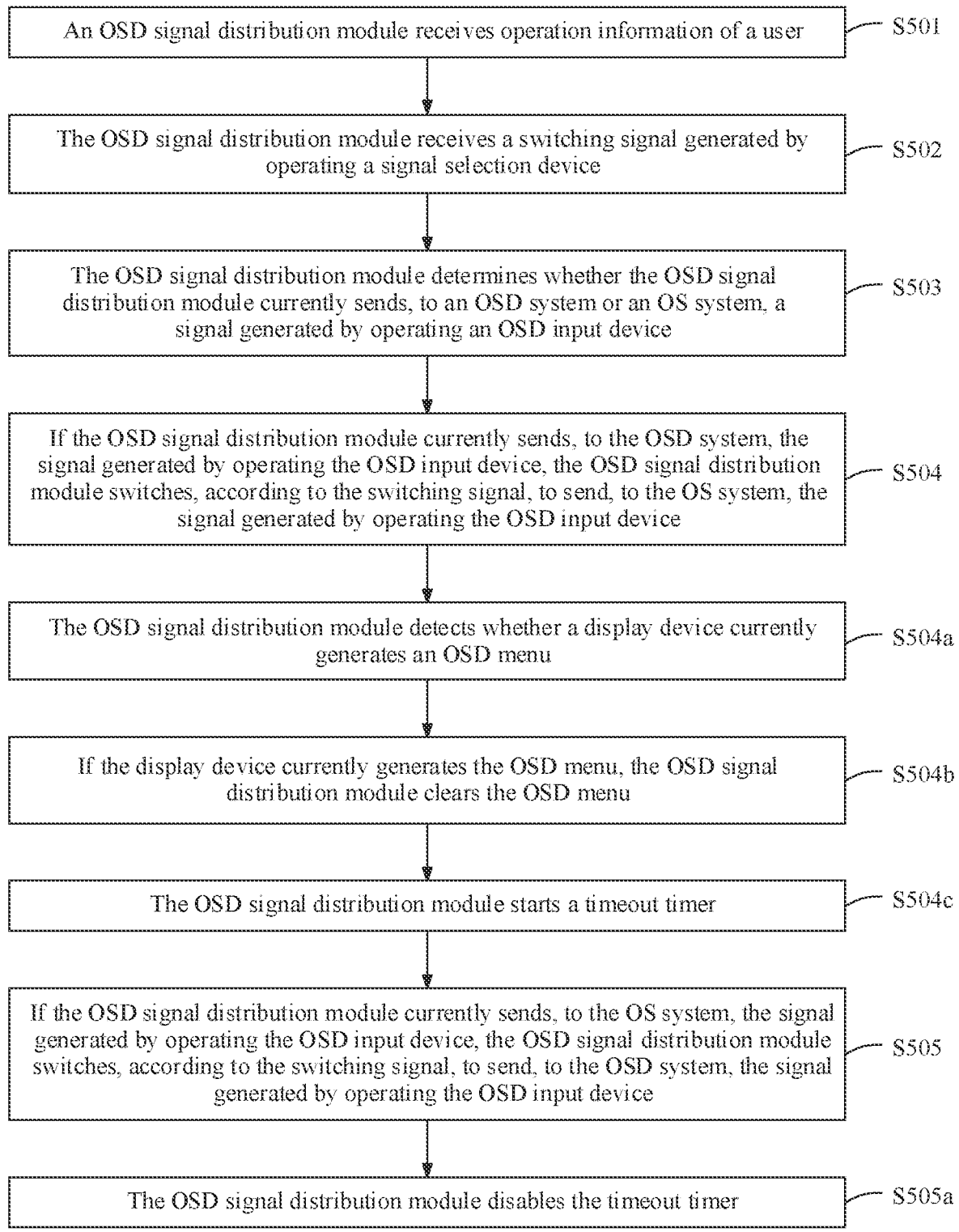
FIG. 5 is a flowchart of controlling switching in a display device control method according to a first embodiment of the present invention.

FIG. 5 is a flowchart of controlling switching in a display device control method according to a first embodiment of the present invention. In this embodiment, the display device performs, according to an operation on the OSD unit, switching controlled by the OSD input device. The control switching in the display device control method may specifically include the following steps.

Step S501: An OSD signal distribution module receives operation information of a user.

Step S502: The OSD signal distribution module receives a switching signal generated by operating a signal selection device.

Step S503: The OSD signal distribution module determines whether the OSD signal distribution module currently sends, to an OSD system or an OS system, a signal generated by operating an OSD input device. Specifically, the OSD signal distribution module determines whether the OSD signal distribution module currently sends, to the OSD system or an OS signal conversion module, the signal generated by operating the OSD input device.

Step S504: If the OSD signal distribution module currently sends, to the OSD system, the signal generated by operating the OSD input device, the OSD signal distribution module switches, according to the switching signal, to send, to the OS system, the signal generated by operating the OSD input device.

Step S505: If the OSD signal distribution module currently sends, to the OS system, the signal generated by operating the OSD input device, the OSD signal distribution module switches, according to the switching signal, to send, to the OSD system, the signal generated by operating the OSD input device.

In this embodiment, to clear an OSD menu generated in the OSD system, after step S504, the method further includes:

Step S504a: The OSD signal distribution module detects whether a display device currently generates an OSD menu.

Step S504b: If the display device currently generates the OSD menu, the OSD signal distribution module clears the OSD menu.

In this embodiment, to avoid that the OSD input device is not operated in the OS system due to timeout, after step S504, the method further includes:

Step S504c: The OSD signal distribution module starts a timeout timer.

In this embodiment, to avoid a limitation on the operation time of the OSD input device in the OS system, after step S505, the method further includes:

Step S505a: The OSD signal distribution module disables the timeout timer.

Figure 6:
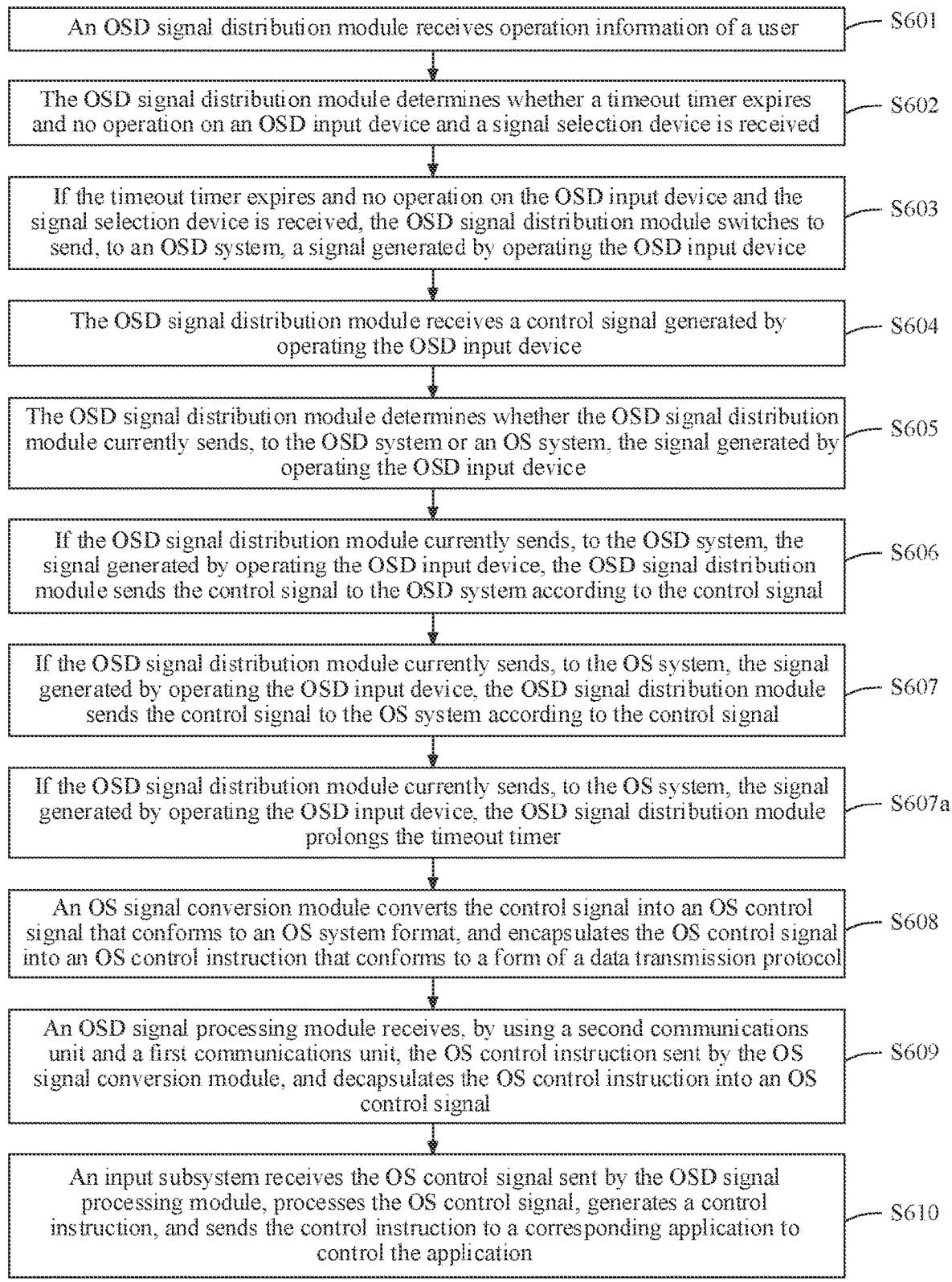
FIG. 6 is a flowchart of a control operation in a display device control method according to a first embodiment of the present invention.

FIG. 6 is a flowchart of a control operation in a display device control method according to a first embodiment of the present invention, which may specifically include the following steps.

Step S601: An OSD signal distribution module receives operation information of a user.

Step S602: The OSD signal distribution module determines whether a timeout timer expires and no operation on an OSD input device and a signal selection device is received.

Step S603: If the timeout timer expires and no operation on the OSD input device and the signal selection device is received, the OSD signal distribution module switches to send, to the OSD system, the signal generated by operating the OSD input device.

Step S604: The OSD signal distribution module receives a control signal generated by operating the OSD input device.

Step S605: The OSD signal distribution module determines whether the OSD signal distribution module currently sends, to the OSD system or an OS system, the signal generated by operating the OSD input device. Specifically, the OSD signal distribution module determines whether the OSD signal distribution module currently sends, to the OSD system or an OS signal conversion module, the signal generated by operating the OSD input device.

Step S606: If the OSD signal distribution module currently sends, to the OSD system, the signal generated by operating the OSD input device, the OSD signal distribution module sends the control signal to the OSD system according to the control signal.

Step S607: If the OSD signal distribution module currently sends, to the OS system, the signal generated by operating the OSD input device, the OSD signal distribution module sends the control signal to the OS system (the OS signal conversion module) according to the control signal.

Step S608: The OS signal conversion module converts the control signal into an OS control signal that conforms to an OS system format, and encapsulate the OS control signal into an OS control instruction that conforms to a format of a data transmission protocol.

Step S609: The OSD signal processing module receives, by using the second communications unit and the first communications unit, the OS control instruction sent by the OS signal conversion module, and decapsulates the OS control instruction into an OS control signal.

Step S610: The input subsystem receives the OS control signal sent by the OSD signal processing module, processes the OS control signal, generates a control instruction, and sends the control instruction to a corresponding application to control the application.

In this embodiment, to prevent the OS system from being switched to the OSD system even if the OSD input device is operated, before step S607, the method further includes:

S607a: If the OSD signal distribution module currently sends, to the OS system, the signal generated by operating the OSD input device, the OSD signal distribution module prolongs the timeout timer.

Figure 7:
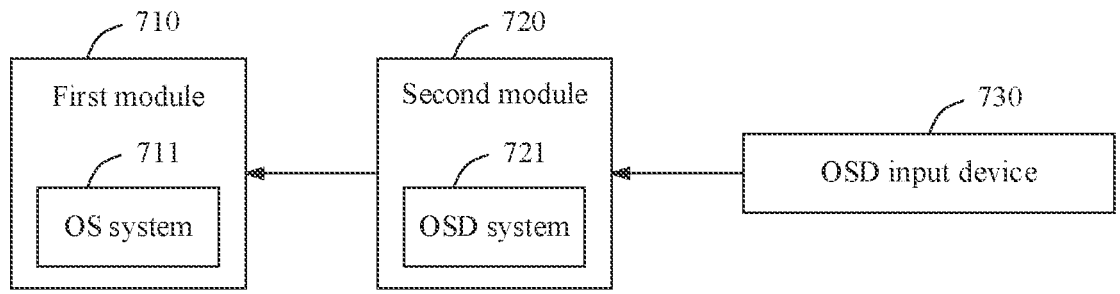
FIG. 7 is a block diagram of a display device according to a second embodiment of the present invention.
Figure 8:
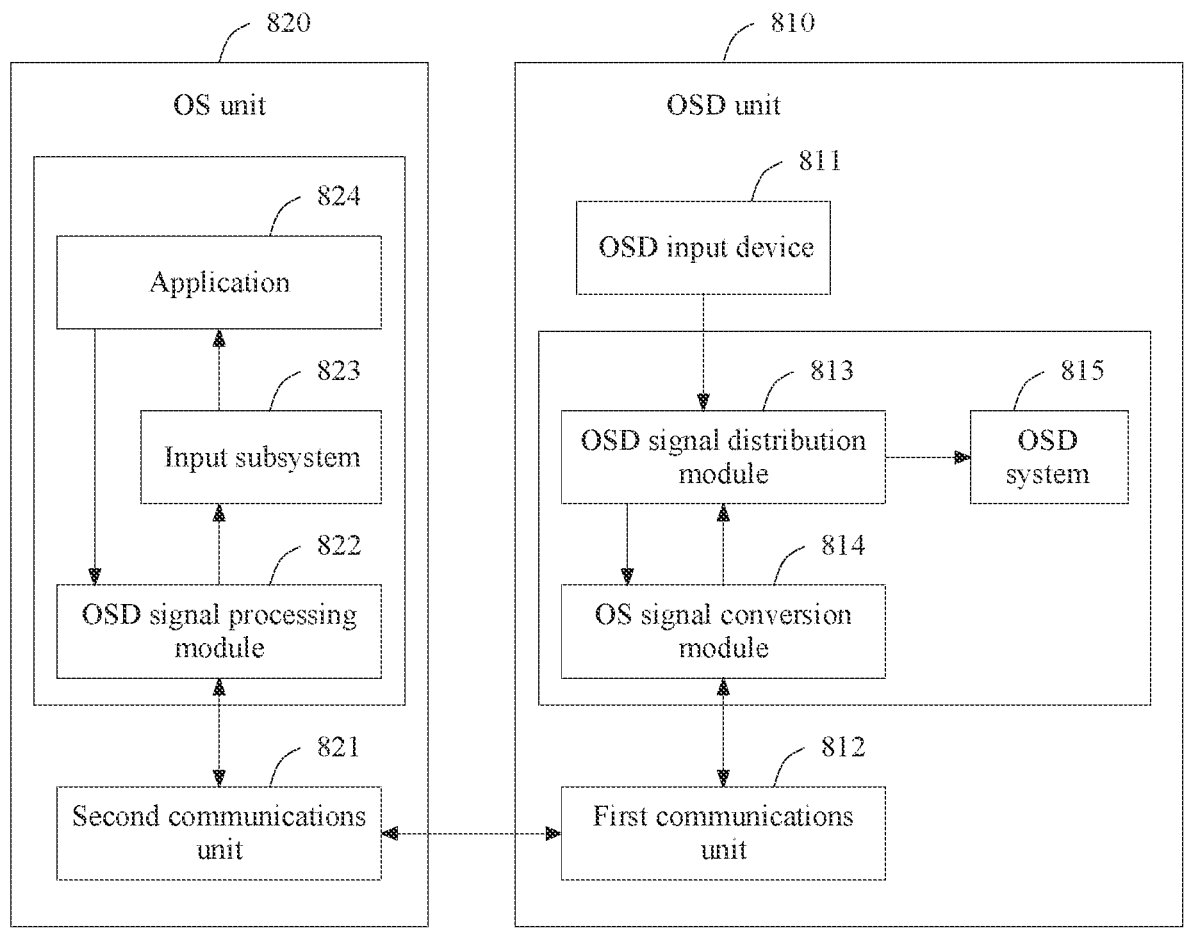
FIG. 8 is a block diagram of communication between an OSD unit and an OS unit of a display device according to a second embodiment of the present invention.

FIG. 7 is a block diagram of a display device according to a second embodiment of the present invention. A display device 700 of this embodiment is similar to the display device 300 of the first embodiment in FIG. 3. The display device 700 also includes a first module 710, a second module 720, and an OSD input device 730, and an OS system 711 is installed in the first module 710. An OSD system 721 is installed in the second module 720. The difference is that: In the display device 700 in this embodiment, the signal selection device 340 of the display device 300 in the first embodiment in FIG. 3 is omitted. The first module 710 in this embodiment may also transmit a signal to the second module 720. The display device 700 of this embodiment is not described herein. In addition, FIG. 8 is a block diagram of communication between an OSD unit and an OS unit of a display device according to a second embodiment of the present invention. The display device 800 includes the OSD unit 810 and the OS unit 820. In this embodiment, the OS unit 820 of the display device 800 automatically performs switching controlled by an OSD input device according to a requirement. The OSD unit 810 of the display device 800 in this embodiment is similar to the OSD unit 410 of the display device 400 in the first embodiment in FIG. 4. The OSD unit 810 of the display device 800 also includes an OSD input device 811 and a first communications unit 812, and the OSD unit 810 of the display device 800 further includes an OSD signal distribution module 813, an OS signal conversion module 814, and an OSD system 815. The difference lies in that: In the OSD unit 810 of the display device 800 in this embodiment, the signal selection device 412 of the OSD unit 410 of the display device 400 in the first embodiment in FIG. 4 is omitted. The OSD signal distribution module 813 further receives a signal sent by the OS signal conversion module 814, and the OS signal conversion module 814 further receives, by using the first communications unit 812, a signal sent by the OS unit 820. The OS unit 820 of the display device 800 in this embodiment is similar to the OS unit 420 of the display device 400 in the first embodiment in FIG. 4. The OS unit 820 of the display device 800 also includes a second communications unit 821, and the OS unit 820 of the display device 800 also includes an OSD signal processing module 822, an input (Input) subsystem 823, and an application 824. The difference lies in that: The OSD signal processing module 822 further sends a signal to the OSD unit 810 by using the second communications unit 821 and the first communications unit 812, and the application 824 further sends a signal to the OSD signal processing module 822.

That the display device 800 switches to send, to the OS system, the signal generated by operating the OSD input device 811 is specifically as follows;

The application 824 is configured to determine, when the application 824 is automatically switched to an interactive state or when a signal sent by an external apparatus is received and the application 824 is switched to the interactive state, whether interaction between a user and the application 824 is required. If the application 824 needs to interact with the user, the application 824 generates a prompt for operating the OSD input device 811, generates a first switching instruction, and sends the first switching instruction to the OSD signal processing module 822. In this embodiment, the prompt for operating the OSD input device 811 may be prompting the user to select a selection box from one or more selection boxes by operating the OSD input device 811.

The OSD signal processing module 822 is configured to: convert the first switching instruction into a first OSD switching signal that conforms to an OSD system format, encapsulate the first OSD signal into a first OSD switching instruction that conforms to a format of a data transmission protocol, and send, by using the second communications unit 821 and the first communications unit 812, the first OSD switching instruction to the OS signal conversion module 814 of the OSD unit 810.

The OS signal conversion module 814 is configured to: decapsulate the first OSD switching instruction to restore the first OSD switching signal, and send the first OSD switching signal to the OSD signal distribution module 813.

The OSD signal distribution module 813 is configured to switch, according to the first OSD switching signal, to send, to the OS system (the OS signal conversion module 814), the signal generated by operating the OSD input device 811. In this embodiment, the OSD signal distribution module 813 is further configured to detect whether the display device 800 currently generates an OSD menu. If the display device 800 currently generates the OSD menu, and the OSD signal distribution module 813 is switched to send the signal to the OS system, the OSD signal distribution module 813 is further configured to clear the OSD menu.

A control operation of the display device 800 is specifically as follows:

The OSD input device 811 is configured to generate a control signal according to an operation and send the control signal to the OSD signal distribution module 813.

The OSD signal distribution module 813 is configured to send the control signal to the OS system (the OS signal conversion module 814) or the OSD system 815 according to the control signal. Specifically, the OSD signal distribution module 813 is configured to: when the control signal is received, determine whether the OSD signal distribution module 813 currently sends, to the OSD system 815 or the OS system, the signal generated by operating the OSD input device 811. If the OSD signal distribution module 813 currently sends, to the OSD system 815, the signal generated by operating the OSD input device 811, the OSD signal distribution module 813 is configured to send the control signal to the OSD system 815 according to the control signal. If the OSD signal distribution module 813 currently sends, to the OS system, the signal generated by operating the OSD input device 811, the OSD signal distribution module 813 is configured to send the control signal to the OS system (the OS signal conversion module 814) according to the control signal.

The OS signal conversion module 814 is configured to: convert the control signal into an OS control signal that conforms to an OS system format, and encapsulate the OS control signal into an OS control instruction that conforms to a format of a data transmission protocol. Operations performed by the OS signal conversion module 814, the OSD signal processing module 822, the input subsystem 823, and the application 824 according to the control signal are the same as operations performed by the OS signal conversion module 415, the OSD signal processing module 422, the input subsystem 423, and the application 424 according to the control signal in FIG. 4. Details are not described herein.

The application 824 is configured to clear, according to the control instruction, the prompt for operating the OSD input device 811.

That the display device 800 switches to send, to the OSD system 815, the signal generated by operating the OSD input device 811 is specifically as follows:

The application 824 is configured to: if the user does not need to interact with the application 824, generate a second switching instruction, and send the second switching instruction to the OSD signal processing module 822. In this embodiment, when detecting the prompt for performing a clear operation on the OSD input device 811, the application 824 determines that the user does not need to interact with the application 824.

The OSD signal processing module 822 is configured to: convert the second switching instruction into a second OSD switching signal that conforms to a format of the OSD system 815, encapsulate the second OSD signal into a second OSD switching instruction that conforms to a format of a data transmission protocol, and send, by using the second communications unit 821 and the first communications unit 812, the second OSD switching instruction to the OS signal conversion module 814 of the OSD unit 810.

The OS signal conversion module 814 is configured to: decapsulate the second OSD switching instruction to restore the second OSD switching signal, and send the second OSD switching signal to the OSD signal distribution module 813.

The OSD signal distribution module 813 is configured to switch, according to the second OSD switching signal, to send, to the OSD system 815, the signal generated by operating the OSD input device 811.

In this embodiment, both the first switching instruction and the second switching instruction are state synchronization signals. Correspondingly, the OSD signal distribution module 813 is configured to switch, according to the state synchronization signal, to send, to the OS system or the OSD system 815, the signal generated by operating the OSD input device 811. The first switching instruction may be a state synchronization signal including the first switching instruction, and the second switching instruction may be a state synchronization signal including the second switching instruction. The OSD signal distribution module 813 is configured to: switch, according to the state synchronization signal including the first switching instruction, to send, to the OS system, the signal generated by operating the OSD input device 811, and switch, according to the state synchronization signal including the second switching instruction, to send, to the OSD system 815, the signal generated by operating the OSD input device 811.

Figure 9:
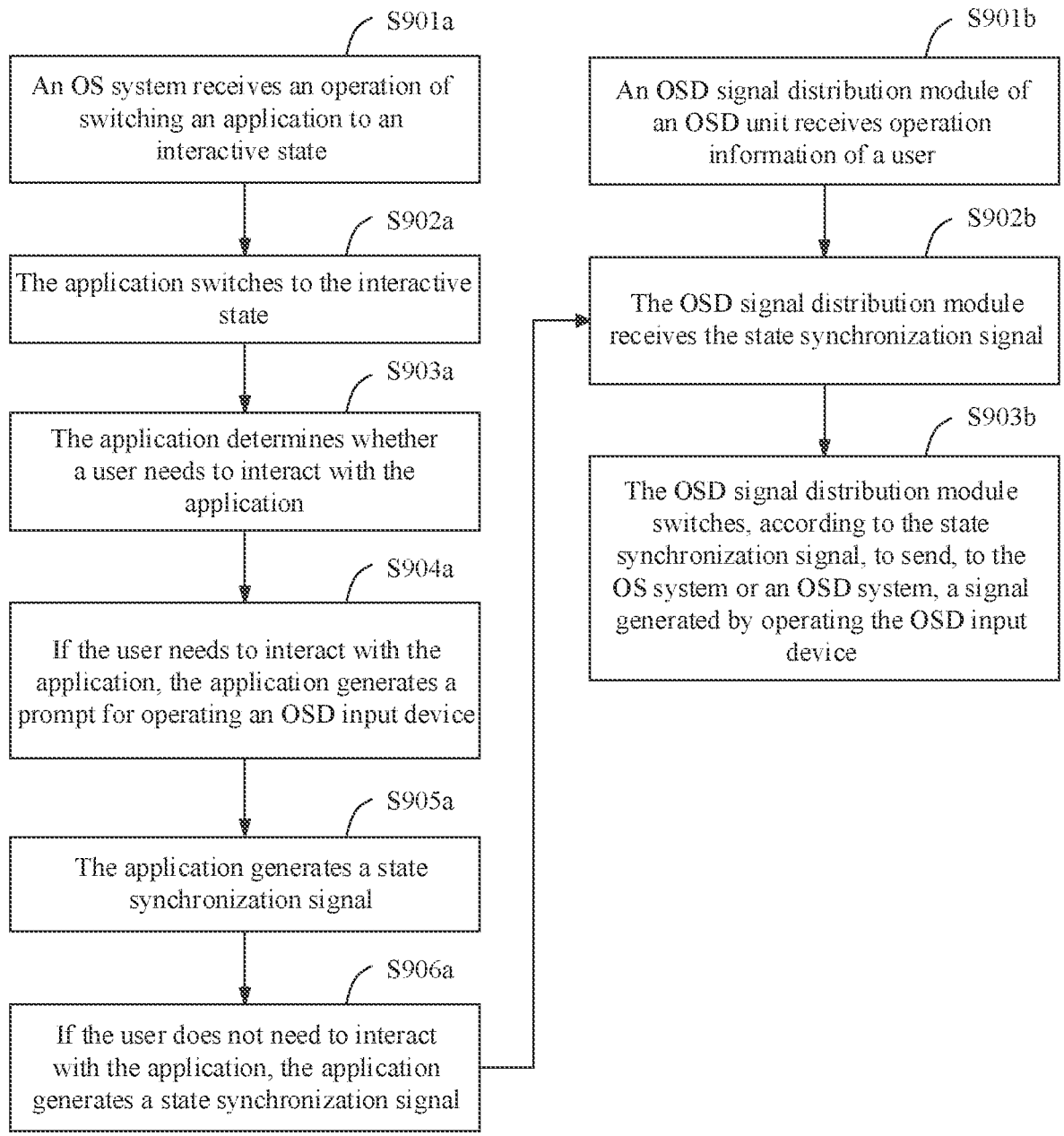
FIG. 9 is a flowchart of controlling switching in a display device control method according to a second embodiment of the present invention.

FIG. 9 is a flowchart of controlling switching in a display device control method according to a second embodiment of the present invention. In this embodiment, an OS unit of the display device automatically performs, according to a requirement, switching controlled by the OSD input device. The control switching in the display device control method may specifically include the following steps.

Step S901a: An OS system receives an operation of switching an application to an interactive state.

Step S902a: The application switches to the interactive state.

Step S903a: The application determines whether a user needs to interact with the application.

Step S904a: If the user needs to interact with the application, the application generates a prompt for operating the OSD input device.

Step S905a: The application generates a state synchronization signal. In step S905, the state synchronization signal is a state synchronization signal including a first switching instruction.

Step S906a: if the user does not need to interact with the application, the application generates a state synchronization signal. In step S906, the state synchronization signal is a state synchronization signal including a second switching instruction. After step S906a is performed, step S902b is performed.

Step S901b: An OSD signal distribution module of an OSD unit receives operation information of a user.

Step S902*b*: The OSD signal distribution module receives the state synchronization signal. The state synchronization signal may be the state synchronization signal including the first switching instruction. The state synchronization signal may further include the state synchronization signal including the second switching instruction.

Step S903*b*: The OSD signal distribution module switches, according to the state synchronization signal, to send, to the OS system or the OSD system, the signal generated by operating the OSD input device. In this embodiment, if the state synchronization signal is the state synchronization signal including the first switching instruction, the OSD signal distribution module switches, according to the state synchronization signal including the first switching instruction, to send, to the OS system, the signal generated by operating the OSD input device. If the state synchronization signal is the state synchronization signal including the second switching instruction, the OSD signal distribution module switches, according to the state synchronization signal including the second switching instruction, to send, to the OSD system, the signal generated by operating the OSD input device.

In this embodiment, after step S906*a*, the method further includes: The OSD signal processing module and the OS signal conversion module perform operations according to the state synchronization signal. The state synchronization signal may be the state synchronization signal including the first switching instruction. The state synchronization signal may further include the state synchronization signal including the second switching instruction. For specific details of the operations performed by the OSD signal processing module and the OS signal conversion module according to the state synchronization signal, refer to the OSD signal processing module and the OS signal conversion module in FIG. 8. Details are not described herein again.

Figure 10:
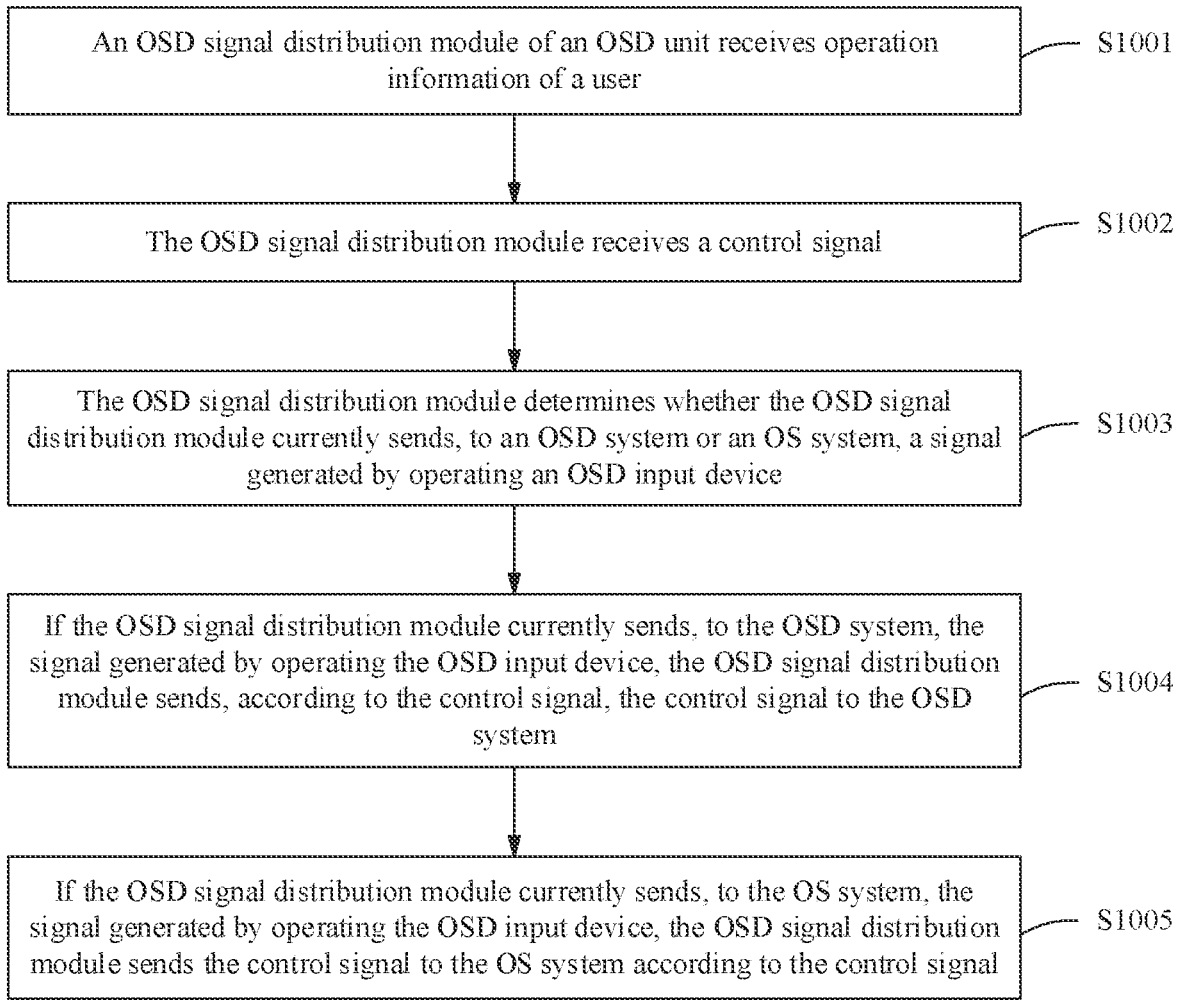
FIG. 10 is a flowchart of a control operation in a display device control method according to a second embodiment of the present invention.

FIG. 10 is a flowchart of a control operation in a display device control method according to a second embodiment of the present invention, which may specifically include the following steps.

Step S1001: An OSD signal distribution module of an OSD unit receives operation information of a user.

Step S1002: The OSD signal distribution module receives a control signal.

Step S1003: The OSD signal distribution module determines whether the OSD signal distribution module currently sends, to an OSD system or an OS system, a signal generated by operating an OSD input device. Specifically, the OSD signal distribution module determines whether the OSD signal distribution module currently sends, to the OSD system or an OS signal conversion module, the signal generated by operating the OSD input device.

Step S1004: If the OSD signal distribution module currently sends, to the OSD system, the signal generated by operating the OSD input device, the OSD signal distribution module sends the control signal to the OSD system according to the control signal.

Step S1005: If the OSD signal distribution module currently sends, to the OS system, the signal generated by operating the OSD input device, the OSD signal distribution module sends the control signal to the OS system (the OS signal conversion module) according to the control signal.

In this embodiment, after step S1005, the method further includes: The OS signal conversion module, the OSD signal processing module, and the input subsystem perform operations according to the control signal. For specific details of the operations performed by the OS signal conversion module, the OSD signal processing module, and the input subsystem according to the control signal, refer to step S608 to step S610 in FIG. 6. Details are not described herein again.

The following describes in detail, with reference to a specific application scenario, a process in which the application of the display device in the second embodiment is switched to the interactive state.

When the display device detects that a new version needs to be upgraded, the application of the OS unit of the display device determines that the user needs to interact with the application. The application generates a prompt for operating the OSD input device. For example, the application generates a prompt interface. The prompt interface includes prompt information and a selection control. The prompt information may be that, for example, a latest version V1.1.2 is detected, and a user taps Update Now. The selection control includes, for example, a determining control and a canceling control. The application generates a first switching instruction. The OSD signal processing module of the OS unit of the display device converts the first switching instruction into a first OSD switching signal that conforms to an OSD system format, encapsulates the first OSD signal into a first OSD switching instruction that conforms to a format of a data transmission protocol, and sends, by using a second communications unit of the OS unit of the display device and a first communications unit of the OSD unit of the display device, the first OSD switching instruction to the OS signal conversion module of the OSD unit.

The OS signal conversion module of the OSD unit of the display device decapsulates the first OSD switching instruction to restore the first OSD switching signal, and sends the first OSD switching signal to the OSD signal distribution module of the OSD unit of the display device. The OSD signal distribution module switches, according to the first OSD switching signal, to send, to the OS system, the signal generated by operating the OSD input device of the OSD unit of the display device.

In response to an operation performed by a user on the OSD input device (for example, an operation on a key 1 of the OSD input device), the OSD input device of the OSD unit of the display device generates a control signal and send the control signal to the OSD signal distribution module according to the operation. The OSD signal distribution module sends the control signal to the OS system (OS signal conversion module) according to the control signal. The OS signal conversion module converts the control signal into an OS control signal that conforms to an OS system format, encapsulates the OS control signal into an OS control instruction that conforms to a format of a data transmission protocol, and sends, by using the first communications unit and the second communications unit, the OS control instruction to the OSD signal processing module of the OS unit.

The OSD signal processing module of the OS unit of the display device decapsulates the OS control instruction to restore the OS control signal. An input subsystem of the OS unit of the display device receives the OS control signal sent by the OSD signal processing module, processes the OS control signal, generates a control instruction, and sends the control instruction to a corresponding application. The application clears, according to the control instruction, the prompt for operating the OSD input device, and performs version upgrade.

In this case, the application of the OS unit of the display device determines that the user does not need to interact with the application, generates a second switching instruction, and sends the second switching instruction to the OSD signal processing module. The OSD signal processing module converts the second switching instruction into a second OSD switching signal that conforms to an OSD system format, encapsulates the second OSD signal into a second OSD switching instruction that conforms to a format of a data transmission protocol, and sends, by using the second communications unit and the first communications unit, the second OSD switching instruction to the OS signal conversion module of the OSD unit.

The OS signal conversion module of the OSD unit of the display device decapsulates the second OSD switching instruction to restore the second OSD switching signal, and sends the second OSD switching signal to the OSD signal distribution module. The OSD signal distribution module switches, according to the second OSD switching signal, to send, to the OSD system, the signal generated by operating the OSD input device. In this way, interaction is completed.

It is clear that the operation performed by the user on the OSD input device may also be a focus shift operation (for example, an operation on a key 2 of the OSD input device). Correspondingly, the application performs focus shift according to the control instruction, and continues to send the first switching instruction to the OSD signal processing module until the prompt for operating the OSD input device is cleared.

The foregoing application scenario in which the display device performs version upgrade is merely a description of an actual application of the display device. The display device may be further used in another application scenario according to an actual requirement, for example, an application scenario in which the display device is started for the first time and a user needs to perform OOBE (Out-of-box experience) interaction, an application scenario in which the display device performs DLNA (DIGITAL LIVING NETWORK ALLIANCE) projection playback if a user needs to control interaction such as playback, pause, fast-forward, rewind, and exit, or an application scenario in which a user triggers projection of a display device by scanning a mobile phone code, touching a mobile phone NFC (Near Field Communication), or using a mobile phone projection menu and a prompt for determining whether to allow projection is required is performed for the user. A specific implementation process used in another application scenario is similar to an application scenario in which version upgrade is performed. Details are not described herein again.

In this application, in the display device, a signal selection device may be set to generate a switching signal according to an operation, and correspondingly the OSD input device is switched to control the OS system. The display device may further switch, according to the switching signal generated by operating the signal selection device, to the OSD input device to control the OSD system, so that the OSD system and the OS system are controlled by using the OSD input device, which requires no additional external device and facilitates operations.

In this application, the display device may further automatically generate a first switching signal when the OS system needs to interact, and correspondingly the OSD input device is switched to control the OS system, and may automatically generate a second switching signal when the OS system cancels the interaction, and correspondingly the OSD input device is switched to control the OSD system, so that the OSD system and the OS system are controlled by using the OSD input device, which requires no additional external device and facilitates operations.

In this embodiment, the display device control method includes:
when the operation on the OSD input device is received, determining whether the signal generated by operating the OSD input device is currently sent to the OSD system or the OS system; and
if the signal generated by operating the OSD input device is currently sent to the OS system, switching, according to a control signal generated by the OSD input device, the control signal from being sent to the OSD system to being sent to the OS system.

In this embodiment, the display device control method further includes:
when the operation on the signal selection device is received, determining whether the signal generated by operating the OSD input device is currently sent to the OSD system or the OS system; and
if the signal generated by operating the OSD input device is currently sent to the OSD system, switching, according to a switching signal generated by the signal selection device, the signal generated by operating the OSD input device from being sent to the OSD system to being sent to the OS system.

In this embodiment, after the switching, according to a switching signal generated by the signal selection device, the signal generated by operating the OSD input device from being sent to the OSD system to being sent to the OS system, the display device control method further includes:
starting a timeout timer; and
the method further includes:
after the timeout timer is started, determining whether the timeout timer expires and no operation on the OSD input device and the signal selection device is received; and
if the timeout timer expires and no operation on the OSD input device and the signal selection device is received, switching the signal generated by operating the OSD input device from being sent to the OS system to being sent to the OSD system.

In this embodiment, the display device control method further includes:
when the application is in an interactive state, determining, by using the application, whether the user needs to interact with the application:
generating a first switching instruction if the user needs to interact with the application; and
switching, according to the first switching instruction, the signal generated by operating the OSD input device from being sent to the OSD system to being sent to the OS system.

In this embodiment, the display device control method further includes:
generating a second switching instruction if the user does not need to interact with the application; and
switching, according to the second switching instruction, the signal generated by operating the OSD input device from being sent to the OS system to being sent to the OSD system.

In this embodiment, the display device control method further includes:
converting, by using an OS unit, the first switching instruction into a first OSD switching signal that conforms to an OSD system format, encapsulating the first OSD signal into a first OSD switching instruction that conforms to a format of a data transmission protocol, and sending the first OSD switching instruction to the OSD unit:

decapsulating, by using the OSD unit, the first OSD switching instruction to restore the first OSD switching signal; and switching, by using the OSD unit according to the first OSD switching signal, the signal generated by operating the OSD input device from being sent to the OSD system to being sent to the OS system.

In this embodiment, the display device control method further includes:

if the user needs to interact with the application, generating a prompt for operating the OSD input device; and clearing, according to the control signal, the prompt for operating the OSD input device.

In this embodiment, the display device control method further includes:

detecting whether a display device currently generates an OSD menu; and if the display device currently generates the OSD menu, and the signal generated by operating the OSD input device is switched to be sent to the OS system, clearing the OSD menu.

In this embodiment, the display device control method further includes:

converting, by using an OSD unit, the control signal into an OS control signal that conforms to an OS system format, and encapsulating the OS control signal into an OS control instruction that conforms to a format of a data transmission protocol;

receiving the OS control instruction by using an OS unit, and decapsulating the OS control instruction into the OS control signal; and processing the OS control signal by using the OS unit, generating a control instruction, and sending the control instruction to a corresponding application to control the application.

In this embodiment, the display device includes an OSD input device, and the display device further includes an OSD signal distribution module.

The OSD signal distribution module is configured to: when an operation on the OSD input device is received, determine whether the OSD signal distribution module currently sends, to an OSD system or an OS system, a signal generated by operating the OSD input device.

The OSD signal distribution module is further configured to: if the OSD signal distribution module currently sends, to the OS system, the signal generated by operating the OSD input device; and switch, according to a control signal generated by the OSD input device, the control signal from being sent to the OSD system to being sent to the OS system.

In this embodiment, the display device further includes a signal selection device.

The OSD signal distribution module is further configured to: when an operation on the signal selection device is received, determine whether the OSD signal distribution module currently sends, to the OSD system or the OS system, the signal generated by operating the OSD input device.

The OSD signal distribution module is further configured to: if the OSD signal distribution module currently sends, to the OSD system, the signal generated by operating the OSD input device, switch, according to a switching signal generated by the signal selection device, the signal generated by operating the OSD input device from being sent to the OSD system to being sent to the OS system.

In this embodiment, after the switching, according to a switching signal generated by the signal selection device, the signal generated by operating the OSD input device from being sent to the OSD system to being sent to the OS system, the OSD signal distribution module is further configured to:

start a timeout timer; and determine whether the timeout timer expires and no operation on the OSD input device and the signal selection device is received; and if the timeout timer expires and no operation on the OSD input device and the signal selection device is received, switch the signal generated by operating the OSD input device from being sent to the OS system to being sent to the OSD system.

In this embodiment, the display device further includes an application.

The application is configured to: when the application is in an interactive state, determine whether a user needs to interact with the application.

The application is further configured to generate a first switching instruction if the user needs to interact with the application.

The OSD signal distribution module is further configured to switch, according to the first switching instruction, the signal generated by operating the OSD input device from being sent to the OSD system to being sent to the OS system.

In this embodiment, the application is further configured to generate a second switching instruction if the user does not need to interact with the application.

The OSD signal distribution module is further configured to switch, according to the second switching instruction, the signal generated by operating the OSD input device from being sent to the OS system to being sent to the OSD system.

In this embodiment, the display device further includes an OSD unit and an OS unit, the OSD unit includes an OSD signal distribution module, the OSD unit further includes an OS signal conversion module, the OS unit is in communication connection to the OSD unit, the OS unit includes the application, and the OS unit further includes an OSD signal processing module.

The OSD signal processing module is configured to: receive the first switching instruction sent by the application, convert the first switching instruction into a first OSD switching signal that conforms to an OSD system format, encapsulate the first OSD signal into a first OSD switching instruction that conforms to a format of a data transmission protocol, and send the first OSD switching instruction to the OS signal conversion module.

The OS signal conversion module is configured to: decapsulate the first OSD switching instruction to restore the first OSD switching signal, and send the first OSD switching signal to the OSD signal distribution module.

The OSD signal distribution module is further configured to switch, according to the first OSD switching signal, the signal generated by operating the OSD input device from being sent to the OSD system to being sent to the OS system.

In this embodiment, the display device further includes an OSD unit and an OS unit, the OSD unit includes the OSD signal distribution module, the OSD unit further includes an OS signal conversion module, the OS unit is in communication connection to the OSD unit, and the OS unit includes an OSD signal processing module and an input subsystem.

The OS signal conversion module is configured to convert the control signal into an OS control signal that conforms to an OS system format, and encapsulate the OS control signal into an OS control instruction that conforms to a format of a data transmission protocol.

The OSD signal processing module is configured to receive the OS control instruction, and decapsulate the OS control instruction into the OS control signal.

The input subsystem is configured to receive the OS control signal, process the OS control signal, generate a control instruction, and send the control instruction to a corresponding application to control the application.

The foregoing descriptions of implementations allow persons skilled in the art to clearly understand that, for the purpose of convenient and brief description, division of the foregoing functional modules is used as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division during actual implementation. For example, a plurality of units or components may be combined or integrated into another apparatus, or some features may be ignored or not performed.

In addition, functional units in the embodiments of this application may be integrated into one processing unit, each of the units may exist independently physically, or two or more than two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in the embodiments of this application. The foregoing storage medium includes any medium that can store program code, such as a USB flash drive, a removable hard disk, a read-only memory (Read-Only Memory. ROM), a random access memory (Random Access Memory. RAM), a magnetic disk, or an optical disc.

Finally, it should be noted that the above embodiments are merely provided for describing the technical solutions of the present invention, but not intended to limit the present invention. Although the present invention is described in detail with reference to the example embodiments, persons of ordinary skill in the art should understand that they can still make modifications or equivalent replacement to the technical solutions of the present invention without departing from the spirit and scope of the technical solutions of the present invention.

What is claimed is:

1. A display device control method, comprising:
receiving, on an on-screen display (OSD) input device, a first operation;
generating, by the OSD input device, an operation signal based on the first operation;
generating, by the OSD input device when the operation signal is currently sent to an operating system (OS), a control signal;
sending, according to the control signal when the operation signal is currently sent to the OS, the control signal to the OS;
converting, by using an OSD unit, the control signal into an OS control signal that conforms to an OS format;
encapsulating, by using the OSD unit, the OS control signal into an OS control instruction that conforms to a data transmission protocol;
receiving, by using an OS unit, the OS control instruction;
decapsulating, by using the OS unit, the OS control instruction into the OS control signal;
processing, by using the OS unit, the OS control signal;
generating a control instruction; and
sending the control instruction to a corresponding application to control the corresponding application.

2. The display device control method of claim 1, further comprising:
receiving, on a signal selection device, a second operation;
determining the operation signal is currently sent to an OSD system;
generating, by the signal selection device, a switching signal; and
switching, according to the switching signal, the operation signal from being sent to the OSD system to being sent to the OS.

3. The display device control method of claim 2, wherein after switching the operation signal from being sent to the OSD system to being sent to the OS, the method further comprises:
starting a timeout timer;
determining, after the timeout timer is started, whether either the first operation or the second operation is received before the timeout timer expires; and
switching, when neither the first operation or the second operation is received timeout timer expires, the operation signal from being sent to the OS to being sent to the OSD system.

4. The display device control method of claim 1, further comprising:
determining, when an application is in an interactive state, whether a user needs to interact with the application;
generating a first switching instruction when the user needs to interact with the application; and
switching, according to the first switching instruction, the operation signal from being sent to an OSD system to being sent to the OS.

5. The display device control method of claim 4, further comprising:
generating a second switching instruction when the user does not need to interact with the application; and
switching, according to the second switching instruction, the operation signal from being sent to the OS to being sent to the OSD system.

6. The display device control method of claim 4, further comprising:
converting, by using the OSD unit, the first switching instruction into a first OSD switching signal that conforms to an OSD system format, encapsulating the first OSD switching signal into a first OSD switching instruction that conforms to a format of a data transmission protocol, and sending the first OSD switching instruction to the OSD unit;

decapsulating, by using the OSD unit, the first OSD switching instruction to restore the first OSD switching signal; and switching, by using the OSD unit according to the first OSD switching signal, the operation signal from being sent to the OSD system to being sent to the OS.

7. The display device control method of claim 4, further comprising:

generating, when the user needs to interact with the application, an operation prompt for operating the OSD input device; and clearing, according to the control signal, the operation prompt.

8. The display device control method of claim 1, further comprising:

detecting whether a display device currently generates an OSD menu; and clearing, when the display device currently generates the OSD menu and the operation signal is switched to be sent to the OS, the OSD menu.

9. A display device, comprising:

an on-screen display (OSD) input device configured to:
receive a first operation;
generate an operation signal based on the first operation; and
generate a control signal;

an OSD unit comprising:
an OSD signal distributor configured to:
send, to an operating system (OS), the operation signal; and
send, according to the control signal when the operation signal is currently sent to the OS, the control signal to the OS; and
an OS signal converter configured to:
convert the control signal into an OS control signal that conforms to an OS format; and
encapsulate the OS control signal into an OS control instruction that conforms to a data transmission protocol; and an OS unit in communication with the OSD unit and comprising:
an OSD signal processor configured to:
receive the OS control instruction; and
decapsulate the OS control instruction into the OS control signal; and
an input system configured to:
receive the OS control signal;
process the OS control signal;
generate a control instruction; and
send the control instruction to a corresponding application to control the corresponding application.

10. The display device of claim 9, further comprising a signal selection device configured to:

receive a second operation; and
generate a switching signal,
wherein the OSD signal distributor is further configured to:
determine the OSD signal distributor currently sends the operating signal to an OSD system; and
switch, according to the switching signal, the operation signal from being sent to the OSD system to being sent to the OS.

11. The display device of claim 10, wherein after switching the operation signal from being sent to the OSD system to being sent to the OS, the OSD signal distributor is further configured to:

start a timeout timer;
determine whether either the first operation or the second operation is received before the timeout timer expires; and
switch, when neither the first operation or the second operation is received before the timeout timer expires, the operation signal from being sent to the OS to being sent to the OSD system.

12. The display device of claim 9, further comprising an application configured to:

determine, when the application is in an interactive state, whether a user needs to interact with the application; and
generate a first switching instruction when the user needs to interact with the application,
wherein the OSD signal distributor is further configured to switch, according to the first switching instruction, the operation signal from being sent to an OSD system to being sent to the OS.

13. The display device of claim 12, wherein the application is further configured to generate a second switching instruction when the user does not need to interact with the application, and wherein the OSD signal distributor is further configured to switch, according to the second switching instruction, the operation signal from being sent to the OS to being sent to the OSD system.

14. The display device of claim 12, wherein the OSD signal processor is further configured to:
receive the first switching instruction from the application;
convert the first switching instruction into a first OSD switching signal that conforms to an OSD system format;
encapsulate the first OSD signal into a first OSD switching instruction that conforms to a data transmission protocol; and
send the first OSD switching instruction to the OS signal converter,
wherein the OS signal converter is further configured to:
decapsulate the first OSD switching instruction to restore the first OSD switching signal; and
send the first OSD switching signal to the OSD signal distributor, and
wherein the OSD signal distributor is further configured to switch, according to the first OSD switching signal, the operation signal from being sent to the OSD system to being sent to the OS.

15. A computer program product comprising instructions that are stored on a non-transitory computer-readable medium and that, when executed by a processor, cause a display device to:

receive, on an on-screen display (OSD) input device, a first operation;
generate, by the OSD input device, an operation signal based on the first operation;
generate, by the OSD input device when the operation signal is currently sent to an operating system (OS), a control signal;
send, according to the control signal when the operation signal is currently sent to the OS, the control signal to the OS;
convert, by using an OSD unit, the control signal into an OS control signal that conforms to an OS format;
encapsulate, by using the OSD unit, the OS control signal into an OS control instruction that conforms to a data transmission protocol;

receive, by using an OS unit, the OS control instruction;
decapsulate, by using the OS unit, the OS control instruction into the OS control signal;
process, by using the OS unit, the OS control signal;
generate a control instruction; and
send the control instruction to a corresponding application to control the corresponding application.

16. The computer program product of claim 15, wherein the instructions, when executed by the processor, further cause the display device to:
receive, on a signal selection device, a second operation;
determine the operation signal is currently sent to an OSD system;
generate, by the signal selection device, a switching signal; and
switch, according to the switching signal, the operation signal from being sent to the OSD system to being sent to the OS.

17. The computer program product of claim 16, wherein the instructions, when executed by the processor, further cause the display device to:
start a timeout timer;
determine whether either the first operation or the second operation is received before the timeout time expires; and
switch, when neither the first operation or the second operation is received before the timeout timer expires, the operation signal from being sent to the OS to being sent to the OSD system.

18. The computer program product of claim 16, wherein the instructions, when executed by the processor, further cause the display device to:
determine, when an application is in an interactive state, whether a user needs to interact with the application;
generate a first switching instruction when the user needs to interact with the application; and
switch, according to the first switching instruction, the operation signal from being sent to the OSD system to being sent to the OS.

19. The computer program product of claim 18, wherein the instructions, when executed by the processor, further cause the display device to:
generate a second switching instruction when the user does not need to interact with the application; and
switch, according to the second switching instruction, the operation signal from being sent to the OS to being sent to the OSD system.

20. The computer program product of claim 18, wherein the instructions, when executed by the processor, further cause the display device to:
convert, by using the OSD unit, the first switching instruction into a first OSD switching signal that conforms to an OSD system format, encapsulating the first OSD switching signal into a first OSD switching instruction that conforms to a format of a data transmission protocol, and sending the first OSD switching instruction to the OSD unit;
decapsulate, by using the OSD unit, the first OSD switching instruction to restore the first OSD switching signal; and
switch, by using the OSD unit according to the first OSD switching signal, the operation signal from being sent to the OSD system to being sent to the OS.

* * * * *